Patented Oct. 16, 1951

2,571,765

UNITED STATES PATENT OFFICE 2,571,765

ROASTED CHEESE PRODUCTS AND PROCESS FOR MAKING THE SAME

Josephus Joannes Ruys, Woerden, Netherlands, assignor to Eru-Kaasfabriek N. V., Woerden, Netherlands No Drawing. Application March 19, 1948, Serial No. 15,972. In the Netherlands March 19, 1947

8 Claims. (Cl. 99—117)

In addition to all its great nutritive advantages cheese has the one great drawback that it is highly perishable. This is chiefly due to the influence of micro-organisms, which find a fertile soil in the components of the cheese, due also to its relatively high water content.

It has already been proposed to dry cheese in order to improve its keeping qualities. The cheese cannot be dried in pieces, because a thick rind would be formed. So it has been proposed first to liquefy the cheese by increasing its content of water, and then to dry the liquid mass, for example on rollers or by spray-drying. The product so obtained is said to keep indefinitely, and to be capable of being reconverted into soft cheese by soaking it in water. It has likewise been proposed to heat ground cheese and stir it with water until a smooth emulsion has been formed, which is then atomized. This product contains no more than 3 per cent of water and is used for incorporation in foodstuffs.

According to wartime press reports cheese powder was produced and distributed in compressed form among front-line fighting forces. However, this is not an attractive type of cheese.

After extensive experiments it has now been found possible to make cheese available to the public in a novel and durable condition with an attractive appearance and a pleasant flavor. By the present invention it may be produced in the form of small roasted porous shaped structures for example in the form of small bars, rods, cakes, slices, biscuits, etc., having a water content of less than 15 per cent. The water content is preferably less than 10 per cent and often even less than 5 per cent. With such a low water content no micro-organisms can develop.

For the preparation of these products the cheese is first kneaded into a plastic or doughy mass of a consistency suitable for molding. This may be carried out in various ways, for example by first mincing the cheese more or less finely, for example by cutting, grating or grinding, and then kneading it. If the mass so obtained is found to be too soft, water should be removed therefrom by evaporation. If the opposite is the case, water may be added. This depends on the kind of cheese used as started material. It is also possible to start from mixtures of different varieties of cheese, in which case the different varieties and the relative proportions thereof may be so chosen that a mass of the correct consistency is formed. Since a porous final product is desired, it is necessary to distribute a gas in the plastic or doughy mass. This may be done by introducing a sufficient quantity air into the mass. A more suitable method, however, consists in adding substances capable of generating gas. In accordance with the present invention the mass may be molded, for example, by rolling with the aid of a rod press, by extrusion, etc., though a special molding operation is not necessary. If required, the molded objects may be subdivided again by cutting. Finally the product is roasted, as a result of which the water content decreases. This continues until the water content has attained the desired value, whereby a porous and crisp product is simultaneously formed.

The roasting is most effectively carried out in a moderately hot oven. The cheese mass first becomes slightly less stiff, and gas is generated if the above-mentioned substances are present in the mass. Subsequently, dehydration takes place, as a result of which a solid, porous skeleton is produced. By virtue of the foregoing treatments the product acquires its characteristic, brittle and crisp properties and its typical flavor. Practically no fat is separated off during the roasting.

From the foregoing description it will be understood that the invention relates to roasted porous products formed from the normal components of milk, and the invention also includes the addition of separate milk proteins or decomposition products thereof to the cheese or cheese mass. Special mention may be made of casein, by means of which the "body" of the dough and the color and structure of the final products may be still further improved.

These additions do not, of course, include the chemical substances which may be added for the preparation of the products or the conversion products of those substances which may be left therein.

It is also possible, however, to add limited quantities of substances which are foreign to the normal milk components, for example blood proteins or flour. If it is desired to retain the character of cheese in the final product, the quantities of the said added substances should be comparatively small. They may, for example, amount to 5 per cent or more, but should not exceed about 10 per cent.

Instead of or in addition to ordinary cheese it is also possible to treat cheese having no rind.

The following example illustrates the invention:

Cheese was purified, ground in a cutter and finally pressed flat very thoroughly on rollers and pulverized. The initial material was a mixture of 28 kilograms of Edam cheese 40+ (new, 1½–2 months old) and 15 kilograms of cheese 40+ in the form of a loaf or brick (old, 7–8 months). The moisture content of the pulverized mixture was 37.8–37.6 per cent, while the fat content of the dry material amounted to 41.5 per cent. To 400 grams of the plastic mass so obtained were added 1.5 grams of primary calcium phosphate and 2.25 grams of sodium bicarbonate, and the whole was thoroughly mixed and ground twice in a mincer. The resulting cheese mass has a doughy consistency, and the latter was molded in the form of a long trilateral bar. The bar was cut into slices about 0.4 cm. thick, and the latter were placed on a baking pan in a gas oven. The temperature of the oven was about 165° C. but varied between 145 and 170° C. The baking period was 33 minutes. The slices of cheese dough first became soft. Owing to the presence of the added chemical substances gas was generated, so that the dough rose and acquired a light structure. In the course of the baking process the slices became brittle, crisp and light, while they also acquired the typical flavor of roast cheese. The moisture content of the final product was 3.3 per cent, and the fat content of the dry material was 40.7 per cent. The yield was 248 grams.

What I claim is:

1. Roasted cheese in the form of small, thin, brittle, crisp and porous shaped structures having a water content of less than 15 per cent.

2. Roasted cheese in the form of small, thin, brittle, crisp and porous shaped structures having a water content of less than 10 per cent.

3. Roasted cheese in the form of small, thin, brittle, crisp and porous shaped structures having a water content of less than 10 per cent, the solids of which consist of more than 90 per cent of the normal solid constituents of cheese.

4. Process for making roasted cheese in the form of small, thin, brittle, crisp and porous shaped structures, wherein the cheese is kneaded into a plastic dough of a consistency suitable for moulding, a gas is distributed in the dough, the dough is moulded and then roasted until it has a water content of below 10 per cent.

5. Process for making roasted cheese in the form of small, thin, brittle, crisp and porous shaped structures, wherein the cheese is kneaded into a plastic dough of a consistency suitable for moulding, chemicals capable of generating gas at the roasting temperature are incorporated in the dough, the dough is moulded and then roasted until it has a water content of below 10 per cent.

6. Process as claimed in claim 4, in which additional milk proteins are incorporated in the dough.

7. Process as claimed in claim 4, in which substances foreign to the normal components of milk are incorporated in the dough in a proportion not exceeding 10 per cent.

8. Process as claimed in claim 4, in which flour is incorporated in the dough in a proportion not exceeding 10 per cent.

JOSEPHUS JOANNES RUYS.

REFERENCES CITED

The following references are of record in the file of this patent:

UNITED STATES PATENTS

| Number | Name | Date |
| --- | --- | --- |
| 2,160,902 | Raymond | June 6, 1939 |

OTHER REFERENCES

Farmers' Bulletin 487, U. S. Dept. of Agriculture, Wash., D. C. Issued February 1912; Reprint November 1921, page 36.

I. B. Allen's Modern Cook Book, published by Garden City Co., Inc., Garden City, New York, copyright, 1924, 1935, pages 313 and 317.

Everybody's Cook Book by Lord, Harcourt, Brace and Co., New York, revised edition, page 100.